(12) United States Patent
Baldemair et al.

(10) Patent No.: US 12,363,720 B2
(45) Date of Patent: Jul. 15, 2025

(54) ENHANCED SINGLE DOWNLINK CONTROL INFORMATION MULTI-SLOT SCHEDULING

(71) Applicant: Telefonaktiebolaget LM Ericsson (publ), Stockholm (SE)

(72) Inventors: Robert Baldemair, Solna (SE); Sina Maleki, Malmö (SE); Niklas Andgart, Södra Sandby (SE); Andres Reial, Lomma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 458 days.

(21) Appl. No.: 17/420,890

(22) PCT Filed: Dec. 9, 2019

(86) PCT No.: PCT/SE2019/051250
§ 371 (c)(1),
(2) Date: Jul. 6, 2021

(87) PCT Pub. No.: WO2020/145860
PCT Pub. Date: Jul. 16, 2020

(65) Prior Publication Data
US 2022/0070911 A1    Mar. 3, 2022

Related U.S. Application Data

(60) Provisional application No. 62/789,171, filed on Jan. 7, 2019.

(51) Int. Cl.
*H04W 72/23* (2023.01)
*H04L 5/00* (2006.01)
*H04W 72/21* (2023.01)

(52) U.S. Cl.
CPC ........... *H04W 72/23* (2023.01); *H04L 5/0044* (2013.01); *H04L 5/0094* (2013.01); *H04W 72/21* (2023.01); *H04L 5/0007* (2013.01)

(58) Field of Classification Search
CPC .... H04W 72/23; H04W 72/20; H04L 5/0044; H04L 5/0094; H04L 5/0007
See application file for complete search history.

(56) References Cited

U.S. PATENT DOCUMENTS

2014/0314026 A1* 10/2014 Ko .................... H04W 28/04
370/329
2019/0149269 A1* 5/2019 Chatterjee ............. H04L 5/0094
370/329

(Continued)

OTHER PUBLICATIONS

International Search Report and Written Opinion dated Mar. 10, 2020 for International Application No. PCT/SE2019/051250 filed Dec. 9, 2019, consisting of 15-pages.

(Continued)

*Primary Examiner* — Raj Jain
(74) *Attorney, Agent, or Firm* — Weisberg I.P. Law, P.A.

(57) ABSTRACT

A method, network node and wireless device for single downlink control information (DCI), multiple slot scheduling are disclosed. According to one aspect, a method includes receiving a downlink control information, (DCI) signal in a first slot, the DCI being configured to cause the WD to transmit uplink shared channel transmissions to the network node and/or receive downlink shared channel transmissions from the network node, the transmitting and/or receiving being according to a pattern in a plurality of slots. The method further includes transmitting the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal.

18 Claims, 11 Drawing Sheets

(56) References Cited

U.S. PATENT DOCUMENTS

| | | | |
|---|---|---|---|
| 2020/0145998 A1* | 5/2020 | Sun | H04W 72/23 |
| 2021/0314983 A1* | 10/2021 | Karaki | H04W 72/23 |
| 2022/0039136 A1* | 2/2022 | Takeda | H04W 72/23 |
| 2022/0070911 A1* | 3/2022 | Baldemair | H04L 5/0094 |

OTHER PUBLICATIONS

3GPP TS 38.212 V15.3.0; 3rd Generation Partnership Project; Technical Specification Group Radio Access Network; NR; Multiplexing and channel coding (Release 15), Sep. 2018, consisting of 99-pages.

3GPP TS 38.214 V15.3.0; 3rd Generation Partnership Project; Technical Specification Group Radio Access Network; NR; Physical layer procedures for data (Release 15), Sep. 2018, consisting of 96-pages.

3GPP TS 38.213 V15.3.0; 3rd Generation Partnership Project; Technical Specification Group Radio Access Network; NR; Physical layer procedures for control (Release 15), Sep. 2018, consisting of 101-pages.

3GPP TSG RAN WG1 NR Ad-Hoc Meeting R1-1700026; Title: Scheduling scheme for slot aggregation; Agenda Item: 5.1.3.3; Source: Huawei, HiSilicon; Document for: Discussion and decision; Date and Location: Jan. 16-20, 2017, Spokane, USA, consisting of 6-pages.

3GPP TSG RAN WG1 Meeting #89 R1-1707651; Title: Discussion on multi-slot/cross-slot scheduling for NR; Agenda Item: 7.1.3.3.1; Source: LG Electronics; Document for: Discussion and decision; Date and Location: May 15-19, 2017, Hangzhou, P.R. China, consisting of 4-pages.

3GPP TSG RAN WG1 Meeting #93 R1-1806858; Title: Remaining issues on GC-PDCCH; Agenda Item: 7.1.3.1.3; Source: Oppo; Document for: Discussion and Decision; Date and Location: May 21-25, 2018, Busan, Korea, consisting of 5-pages.

\* cited by examiner

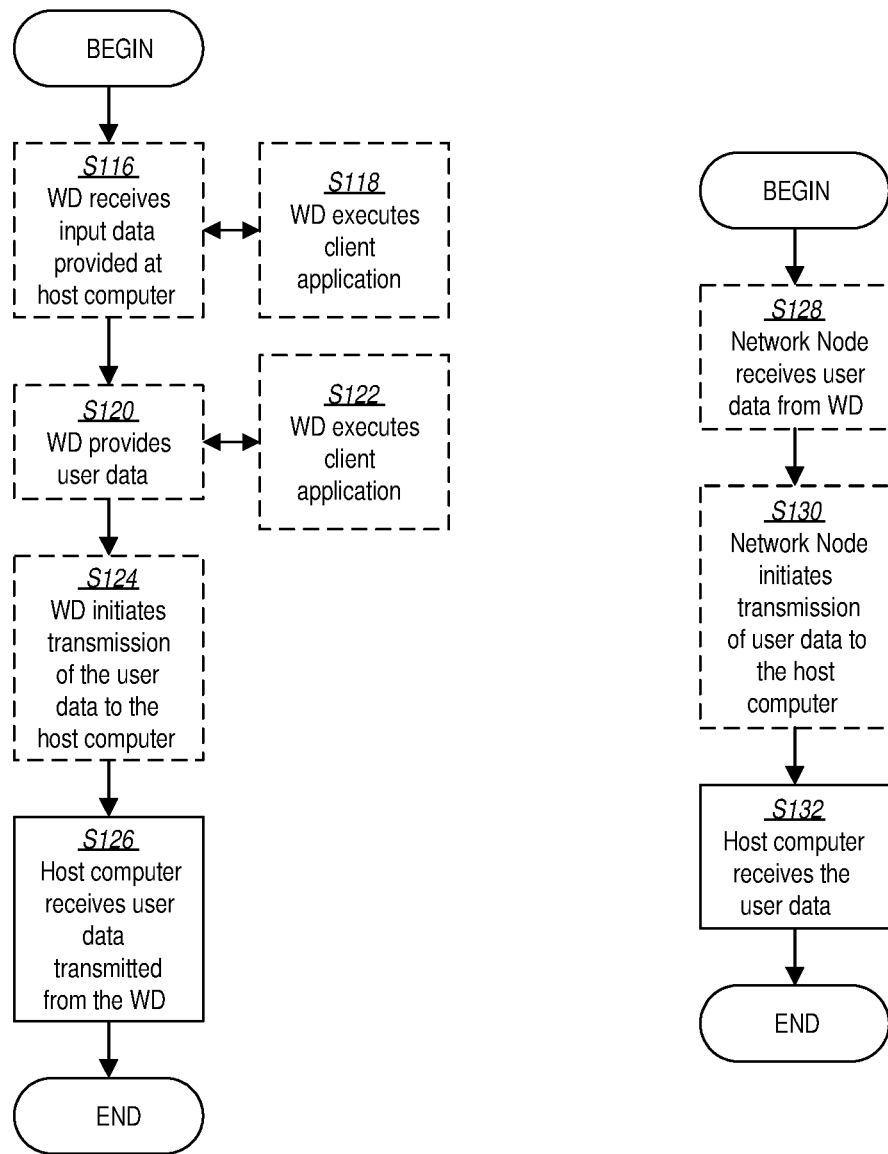

ENHANCED SINGLE DOWNLINK CONTROL INFORMATION MULTI-SLOT SCHEDULING

CROSS-REFERENCE TO RELATED APPLICATIONS

This application is a Submission Under 35 U.S.C. § 371 for U.S. National Stage Patent Application of International Application No.: PCT/SE2019/051250, filed Dec. 9, 2019 entitled "ENHANCED SINGLE DOWNLINK CONTROL INFORMATION MULTI-SLOT SCHEDULING," which claims priority to U. S. Provisional Application No. 62/789, 171, filed Jan. 7, 2019, entitled "ENHANCED SINGLE DOWNLINK CONTROL INFORMATION MULTI-SLOT SCHEDULING," the entireties of both of which are incorporated herein by reference.

FIELD

The present disclosure relates to wireless communications, and in particular, to enhanced single downlink control information (DCI), multi-slot scheduling.

BACKGROUND

The New Radio (NR) standard (also known as 5G) of the Third Generation Partnership Project (3GPP) is being developed to provide service for multiple uses such as for enhanced mobile broadband (eMBB), ultra-reliable low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps moderate data rates.

One solution for low latency data transmission involves the use of shorter transmission time intervals (TTIs). In NR, in addition to transmission in a slot, a mini-slot transmission is also used to reduce latency. A mini-slot, which is referred to in NR terminology as Type B scheduling, may consist of any number of 1 to 14 orthogonal frequency division multiplexed (OFDM) symbols in the uplink (UL) (i.e., from a wireless device to a base station) and 2, 4 or 7 symbols in the downlink (DL) (i.e., from the base station to the wireless device). This is specified in 3GPP Technical Release, referred to herein as 3GPP Release-15 (Rel-15). It should be noted that the concepts of slot and mini-slot are not specific to a service. Rather, a mini-slot may be used for either eMBB, URLLC, or other services.

A downlink physical channel corresponds to a set of resource elements carrying information originating from higher layers and allocated for downlink transmission. The downlink physical channels include:
  Physical Downlink Shared Channel, PDSCH
  Physical Broadcast Channel, PBCH
  Physical Downlink Control Channel, PDCCH The PDSCH is the main physical channel used for unicast downlink data transmission. This channel is also used for transmission of random access responses (RAR), certain system information blocks (SIB), and paging information. The PBCH carries the basic system information required by the wireless device (WD) to access the network and to read remaining system information in an SIB denoted as SIB1. The PDCCH is used for transmitting downlink control information (DCI), which includes scheduling decisions required for reception of the PDSCH, and for uplink scheduling grants enabling transmission on the physical uplink shared channel (PUSCH), described below.

An uplink physical channel corresponds to a set of resource elements carrying information originating from higher layers and allocated for uplink transmissions. The uplink physical channels include:
  Physical Uplink Shared Channel, PUSCH.
  Physical Uplink Control Channel, PUCCH
  Physical Random Access Channel, PRACH The PUSCH is the uplink counterpart to the PDSCH. The PUCCH is used by WDs to transmit uplink control information (UCI), including hybrid automatic repeat request (HARQ) acknowledgements, channel state information (CSI) reports, etc. The PRACH is used for random access preamble transmission.

FIG. 1 is a diagram of time-frequency resources, from which PUSCH and/or PDSCH resources can be allocated. For example, one resource element may occupy a frequency bandwidth of 15 kilo Hertz and one OFDM symbol, including a cyclic prefix.

Different formats of the DCI transmitted on the PDCCH exist. For example, the downlink DCI format 1-0 has the following fields and attributes.
  Identifier for DCI formats—1 bit;
  The value of this bit field is always set to 1, indicating a DL DCI format;
  Frequency domain resource assignment—$\lceil \log_2(N_{RB}^{DL,BWP}(N_{RB}^{DL,BWP}+1)/2) \rceil$ bits;
  $N_{RB}^{DL,BWP}$ is the size of the active DL bandwidth part in case DCI format 1_0 is monitored in the WD specific search space and satisfying the following two conditions:
    the total number of different DCI sizes configured to monitor is no more than 4 for the cell; and
    the total number of different DCI sizes with a cell radio network temporary identifier (C-RNTI) configured to monitor is no more than 3 for the cell.
    otherwise, $N_{RB}^{DL,BWP}$ is the size of control resource set 0 (CORESET 0);
  Time domain resource assignment—4 bits, for example, as defined in Subclause 5.1.2.1 of Technical Standard (TS) 38.214;
  Virtual to physical resource block (VRB-to-PRB) mapping-1 bit, for example, according to Table 7.3.1.1.2-33 of 3GPP Rel-15;
  Modulation and coding scheme (MCS)-5 bits, for example, as defined in Subclause 5.1.3 of 3GPP Technical Specification (TS) 38.214;
  New data indicator—1 bit;
  Redundancy version—2 bits, for example, as may defined in certain 3GPP technical specification;
  Hybrid automatic repeat request (HARQ) process number—4 bits;
  Downlink assignment index—2 bits, for example, as defined in Subclause 9.1.3 of 3GPP TS 38.213, as counter DAI (downlink assignment index);
  Transmit Power Control (TPC) command for scheduled PUCCH—2 bits, for example, as defined in Subclause 7.2.1 of 3GPP TS 38.213;
  PUCCH resource indicator—3 bits as defined, for example, in Subclause 9.2.3 of 3GPP TS 38.213; and
  PDSCH-to-HARQ feedback timing indicator—3 bits, for example, as defined in Subclause 9.2.3 of 3GPP TS38.213.
Slot Aggregation DL:
  When the WD is configured with aggregationFactorDL>1, the same symbol allocation is applied across the aggregationFactorDL consecutive slots. The WD may expect that the transport block (TB) is repeated within each symbol allocation among each of the aggregationFactorDL consecutive slots and the PDSCH is limited to a single transmission layer.

If the WD procedure for determining a slot configuration, for example, as defined in Subclause 11.1 of 3GPP TS 38.213, determines the symbols of a slot allocated for PDSCH as uplink symbols, the transmission on that slot is omitted for multi-slot PDSCH transmission.

Slot Aggregation UL:

When the WD is configured with aggregationFactorUL>1, the same symbol allocation is applied across the aggregationFactorUL consecutive slots and the PUSCH is limited to a single transmission layer. The WD repeats the transport block (TB) across the aggregationFactorUL consecutive slots applying the same symbol allocation in each slot.

If the WD procedure for determining slot configuration, as defined in subclause 11.1 of 3GPP TS 38.213, determines symbols of a slot allocated for PUSCH as downlink symbols, the transmission on that slot is omitted for multi-slot PUSCH transmission.

Multi Slot Scheduling:

Within the SI, WD PS for 3GPP Rel 16, some proposals have been made with regard to enabling a PDCCH scheduling occasion to schedule multiple slots (of, for example, the PDSCH) with the underlying resource indicators, etc. As such, the processing time is claimed to be reduced, which yields power savings. An example of such a mechanism is provided in FIG. 2, which shows scheduling of successive physical downlink shared channel transmissions in slots 2 and 3 in response to a DCI in slot 0.

Conventional multi-slot scheduling mechanisms rely on a single DCI including the scheduling indication of a number of, for example, PDSCH slots, with each of them potentially having a different resource assignment, etc. This leads to a large DCI size which increases the BD burden of the WD and increases the PDCCH blocking probability.

Slot aggregation as an established form of multi-slot scheduling in 3GPP Rel 15 does not involve the high complexity of some types of multi-scheduling mechanisms. However, current slot aggregation mechanisms rely on single layer transmission, and multi-layer transmission is not considered. Slot aggregation also contemplates communication with only one transport block (TB) and the case of multiple TBs is not considered.

Moreover, in these conventional mechanisms, the slots should be consecutive and the possibility of aggregating slots that are separated in time by gaps is not addressed. Furthermore, the mechanism for frequency resource assignment is not specified or is complex. And finally, the slot aggregation level indicator, for example the parameter, aggregationFactorDL, is configured by radio resource control (RRC) signaling, which is robust but does not allow dynamic adaptation.

SUMMARY

There is a need for an efficient single DCI multi slot scheduling mechanism with low complexity (as compared with known arrangements) which addresses the aforementioned problems. Some embodiments advantageously provide methods, network nodes and wireless devices for enhanced single DCI, multi slot scheduling. According to one aspect, a method includes receiving at a wireless device (WD) a signal from the network node, the signal configured to cause the WD to schedule shared channel transmissions according to a pattern specified by the signal. The method further includes scheduling by the wireless device shared channel transmissions according to the pattern responsive to a downlink control information, DCI, received on a downlink control channel in a first slot prior to the scheduled shared channel transmissions. The method also includes allocating like time-frequency resources to each of the shared channel transmissions. Allocating like time-frequency resources to the shared channel transmissions may be useful to keep the size of the DCI small, as compared to a size of the DCI when each shared channel transmission is allocated a different amount of time-frequency resources. Note that by like time-frequency resources, it is meant that each uplink shared channel transmission has the same time duration, the same frequency bandwidth and carrier frequency, and that each downlink shared channel transmission has the same time duration and same frequency bandwidth.

In some embodiments, a single DCI multi slot scheduling methodology for scheduling of the PDSCH and/or the PUSCH is provided that satisfies at least one of the following conditions:

In all slots, the PUSCH/PDSCH has the same time and frequency domain resource assignment. The number of scheduled slots, as specified by the variable named aggregationFactorDL/UL, can be indicated through the scheduling DCI either as a specific field or implicitly via a radio network temporary identifier (RNTI) or search space control resource set (CORESET) used to send the DCI. Or the number of scheduled slots may be indicated based on pre-configuration by a network node through RRC or medium access control (MAC) control element (CE) signaling.

The slots occupied by the PUSCH and/or PDSCH do not necessarily need to be consecutive and can have preconfigured gaps between them. These gaps or gap patterns can be preconfigured by the network node through RRC or MAC CE signaling or indicated through the scheduling DCI. Thus, one pattern may be consecutive alternation of physical uplink shared channel transmissions and physical downlink shared channel transmissions, without any gaps between consecutive shared channels. Another pattern can be successive shared channels with gaps between them. Other patterns are possible.

In each slot, the PUSCH and/or PDCCH can support a multilayer mechanism. DCI formats 1-1 and 0-1 which are capable for multilayer operations can be used for this purpose.

In each slot, the PUSCH or PDSCH can convey a separate transport block (TB). This can be done though RRC, MAC CE or DCI signaling. According to one aspect, a wireless device, WD, configured to communicate with a network node, includes a radio interface configured to receive a downlink control information, DCI, signal in a first slot, the DCI being configured to cause the WD to transmit uplink shared channel transmissions to the network node and/or receive downlink shared channel transmissions from the network node, the transmitting and/or receiving being according to a pattern in a plurality of slots. The radio interface is further configured to transmit the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal.

According to this aspect, in some embodiments, the transmitting or receiving uses different transport blocks, TBs, in each of at least two slots. In some embodiments, different TBs have different hybrid automatic repeat request, HARQ, identifications, and/or different payload content. In some embodiments, the DCI is configured to cause the WD to transmit and receive according to the pattern without increasing a size of the DCI. In some embodiments, the pattern is indicated by a control signal from the network node to the WD, the control signal being the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, processing circuitry in communication with the transceiver is configured to allocate a first set of like time-frequency resources to each of the uplink shared channel transmissions and allocate a second set of like time-frequency resources to each of the downlink shared channel transmissions. In some embodiments, the DCI signal indicates whether a Hybrid Automatic Repeat Request, HARQ, process is to contain a different transport block, TB, than a previously transmitted TB.

According to another aspect, a method in a wireless device, WD, configured to communicate with a network node, is provided. The method includes receiving, via the radio interface, a downlink control information, DCI, signal in a first slot, the DCI being configured to cause the WD to transmit uplink shared channel transmissions to the network node and/or receive downlink shared channel transmissions from the network node, the transmitting and/or receiving being according to a pattern in a plurality of slots. The method further includes transmitting, via the radio interface, the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal.

According to this aspect, in some embodiments, the transmitting or receiving uses different transport blocks, TBs, in each of at least two slots. In some embodiments, the different TBs have different hybrid automatic repeat request, HARQ, identifications, and/or different payload content. In some embodiments, the DCI is configured to cause the WD to transmit and receive according to the pattern without increasing a size of the DCI. In some embodiments, the pattern is indicated by a control signal from the network node to the WD, the control signal being the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the method further includes allocating, via the processing circuitry, a first set of like time-frequency resources to each of the uplink shared channel transmissions and allocate a second set of like time-frequency resources to each of the downlink shared channel transmissions. In some embodiments, the DCI signal indicates whether a Hybrid Automatic Repeat Request, HARQ, process is to contain a different transport block, TB, than a previously transmitted TB.

According to yet another aspect, a network node configured to communicate with a wireless device, WD includes processing circuitry configured to determine a pattern of uplink and/or downlink shared channel transmissions to be scheduled by the WD in response to a downlink control information, DCI, signal. The processing circuitry is further configured to cause signaling to the WD a signal that includes a rank and that configures the WD to receive downlink shared channel transmissions and/or uplink shared channel transmissions according to the determined pattern and in layers indicated by the rank. The processing circuitry is further configured to schedule the uplink and/or downlink shared channel transmissions according to the determined pattern, and allocate like time-frequency resources to each of the uplink and/or downlink shared channel transmissions.

According to this aspect, in some embodiments, the DCI is configured to cause the WD to transmit and receive according to the pattern without increasing a size of the DCI. In some embodiments, the processing circuitry is further configured to cause signaling of an indication of the pattern to the WD 22 by one of the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the DCI signal indicates whether a Hybrid Automatic Repeat Request, HARQ, process is to contain a different transport block, TB, than a previously transmitted TB.

According to another aspect, a method in a network node configured to communicate with a wireless device, WD, includes determining, via the processing circuitry, a pattern of uplink and/or downlink shared channel transmissions to be scheduled by the WD in response to a downlink control information, DCI, signal. The method also includes signaling to the WD a signal that includes a rank and that configures the WD to receive downlink shared channel transmissions and/or uplink shared channel transmissions according to the determined pattern and in layers indicated by the rank. The method also includes scheduling, via the processing circuitry, the uplink and/or downlink shared channel transmissions according to the determined pattern, and allocating, via the processing circuitry, like time-frequency resources to each of the uplink and/or downlink shared channel transmissions.

According to this aspect, in some embodiments, the DCI is configured to cause the WD to transmit and receive according to the pattern without increasing a size of the DCI. In some embodiments, the method includes causing, via the processing circuitry 68, signaling of an indication of the pattern to the WD by one of the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the DCI signal indicates whether a Hybrid Automatic Repeat Request, HARQ, process is to contain a different transport block, TB, than a previously transmitted TB.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
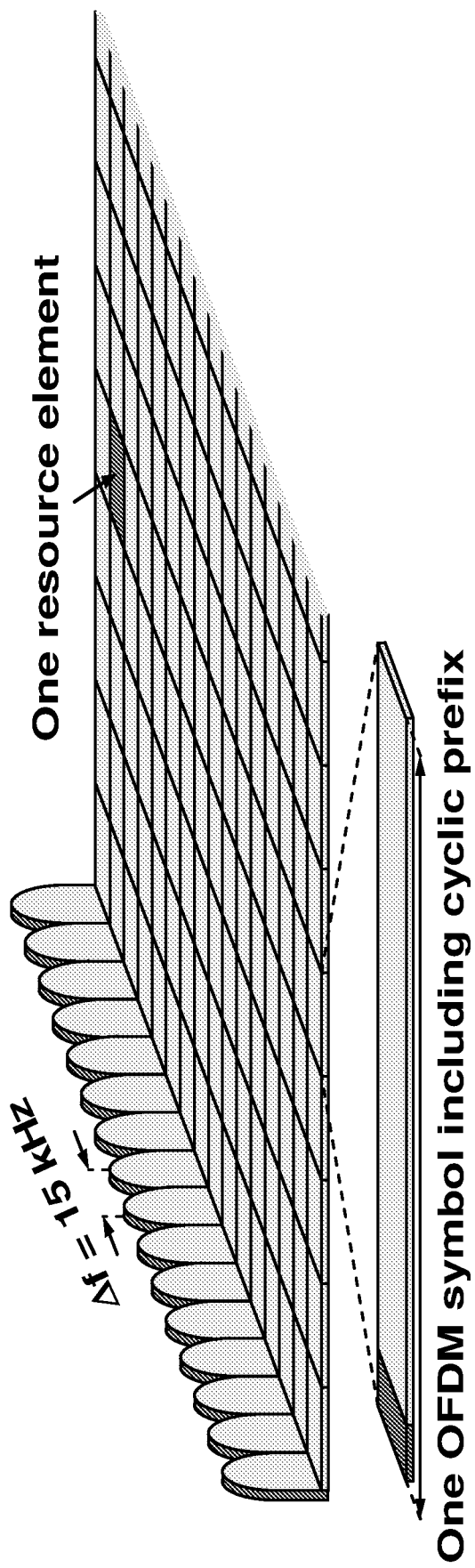
FIG. 1 is a diagram of time-frequency resources.

Before describing in detail exemplary embodiments, it is noted that the embodiments reside primarily in combinations of apparatus components and processing steps related to enhanced single DCI, multi slot scheduling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like reference designators refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide single DCI multi slot scheduling that may provide a higher level of scheduling flexibility to the network as compared to known methods, particularly when the network is experiencing high load conditions. The single DCI multi slot scheduling can be used in case of imminent high information load to indicate at one time through the DCI all of the upcoming scheduling instances, thereby decreasing processing overhead. Embodiments have low complexity compared to known methods, and may use a smaller DCI than known methods, resulting in low PDCCH blocking. Embodiments may enhance awareness by the WD of scheduling in multiple slots at the same time, avoiding dummy PDCCH monitoring and reducing processing overhead. In the event that intermediate slots are not scheduled, and the network will not schedule a PUSCH/PDCCH imminently, the WD can enter a sleep mode to further conserve power.

Figure 3:
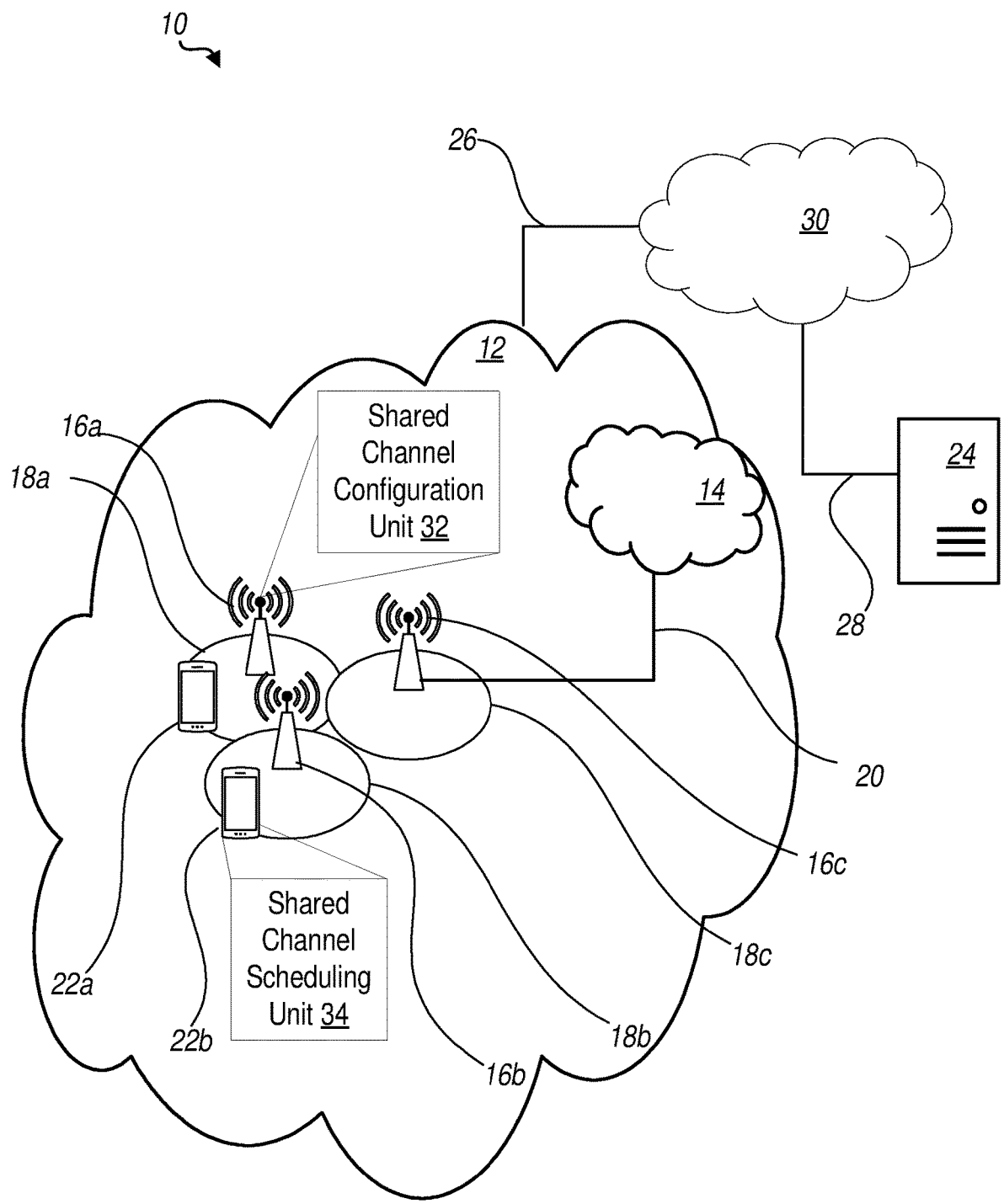
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a shared channel configuration unit 32 which is configured to determine a pattern of shared channel transmissions to be scheduled by the WD in response to a DCI. A wireless device 22 is configured to include a shared channel scheduling unit 34 which is configured to schedule the shared channel transmissions according to the pattern indicated by the network node 16.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a shared channel configuration unit 32 which is configured to determine a pattern of shared channel transmissions to be scheduled by the WD 22 in response to a DCI. The processing circuitry 68 may also include a network node (NN) resource allocator 78 configured to allocate like time-frequency resources to each scheduled shared channel transmission configured by the shared channel configuration unit 32. In some embodiments, the radio interface 62 signals the WD 22 to configure the WD 22 to schedule the shared channel transmissions according to a pattern determined by the shared channel configuration unit 32 Note that to schedule shared channel transmissions means to schedule one or more uplink shared channels transmissions to be transmitted by the wireless device and/or to schedule one or more downlink shared channel transmissions to be received by the wireless device. These shared channel transmissions may be consecutive, may alternate, may alternate in groups and may be separated by gaps.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a shared channel scheduling unit 34 configured to schedule shared channel transmissions according to a pattern determined by the shared channel configuration unit 32 of the network node 16. The processing circuitry 84 may also include a WD resource allocator unit 96 configured to allocate like time-frequency resources to the shared channel transmissions according to the pattern indicated by signaling received by the radio interface 82 of the WD 22 from the radio interface 62 of the network node 16.

Figure 4:
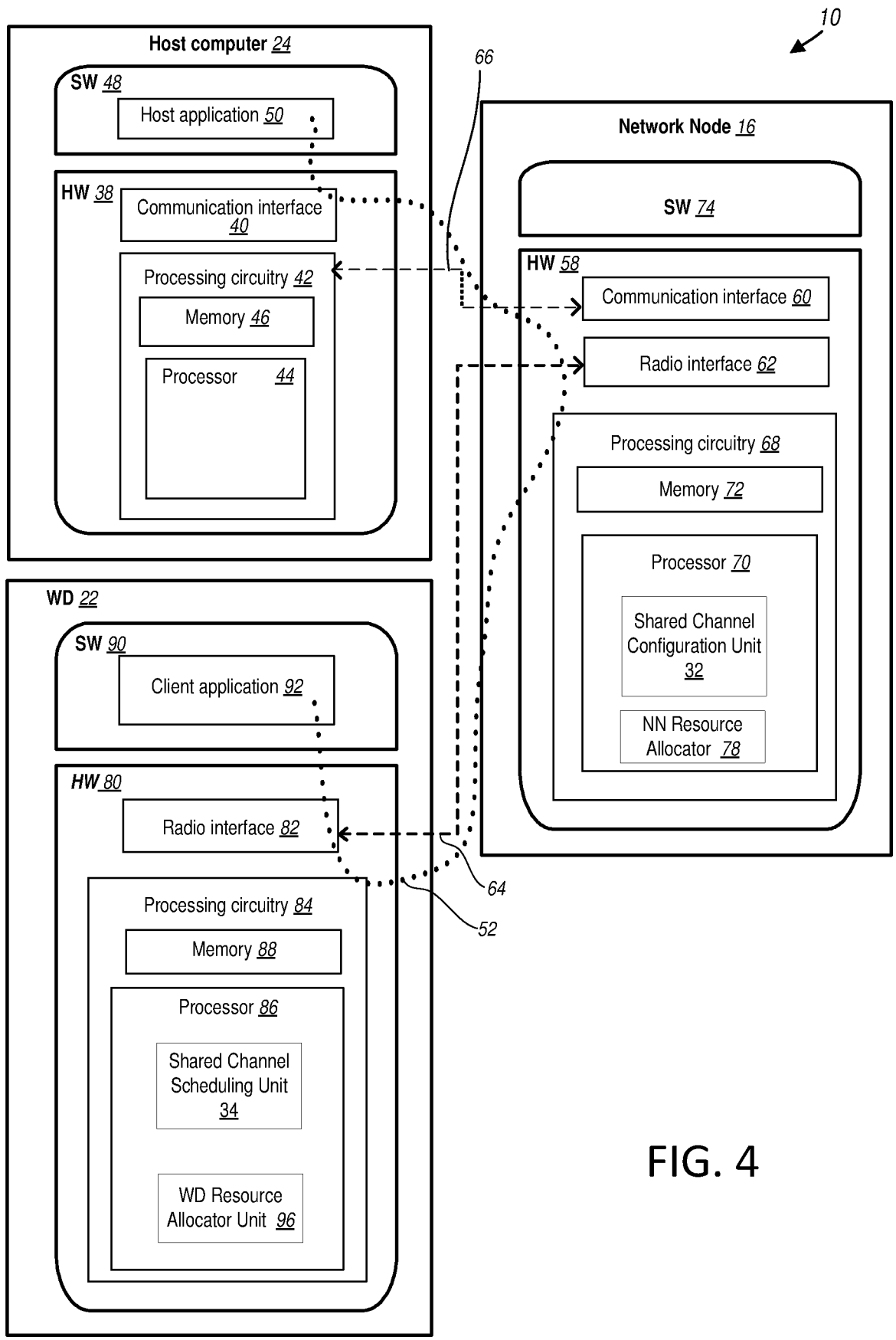
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62.

In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Figure 2:
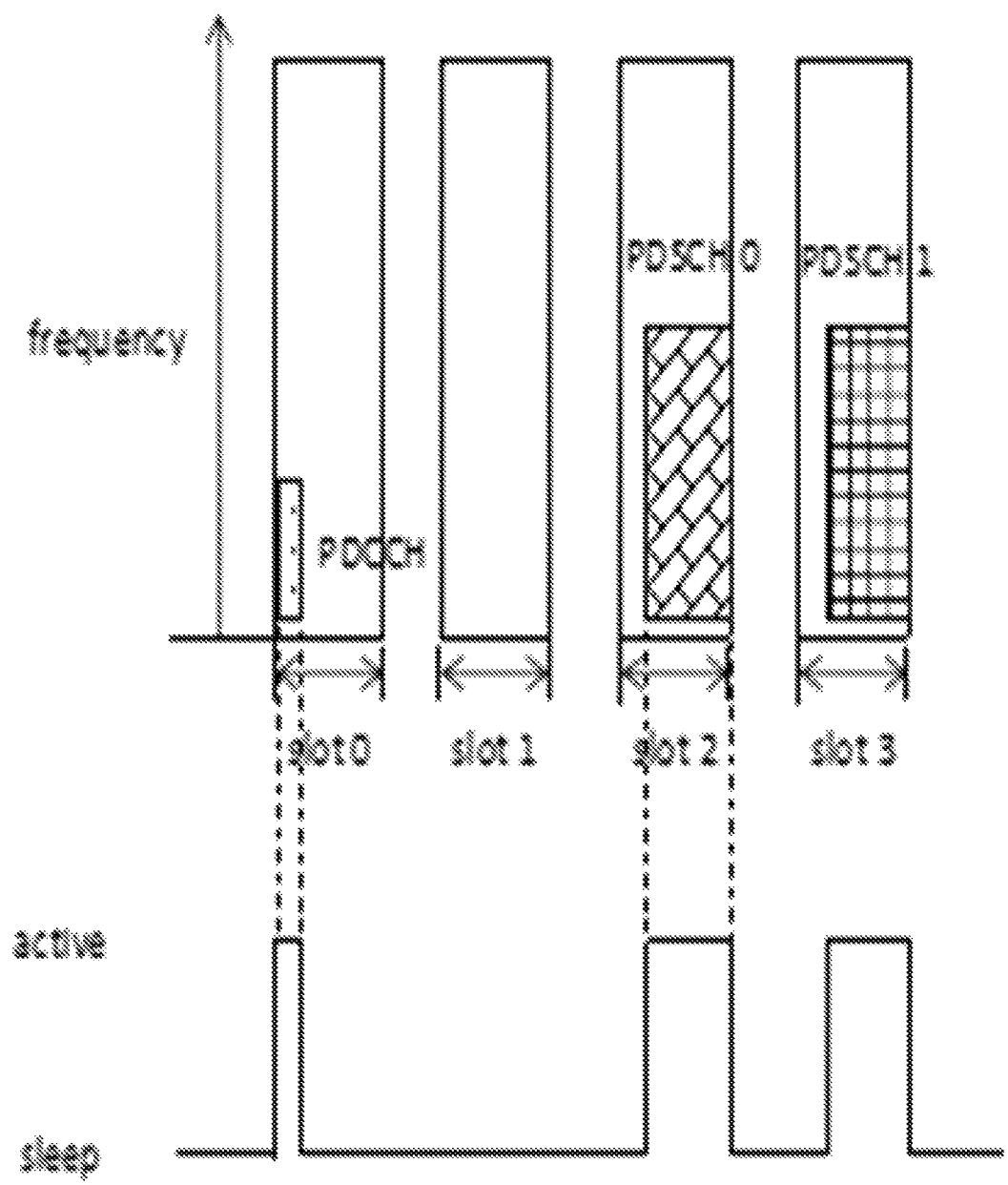
FIG. 2 is diagram of scheduling successive physical downlink shared channel transmissions.

Although FIGS. 1 and 2 show various "units" such as shared channel configuration unit 32, and shared channel scheduling unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
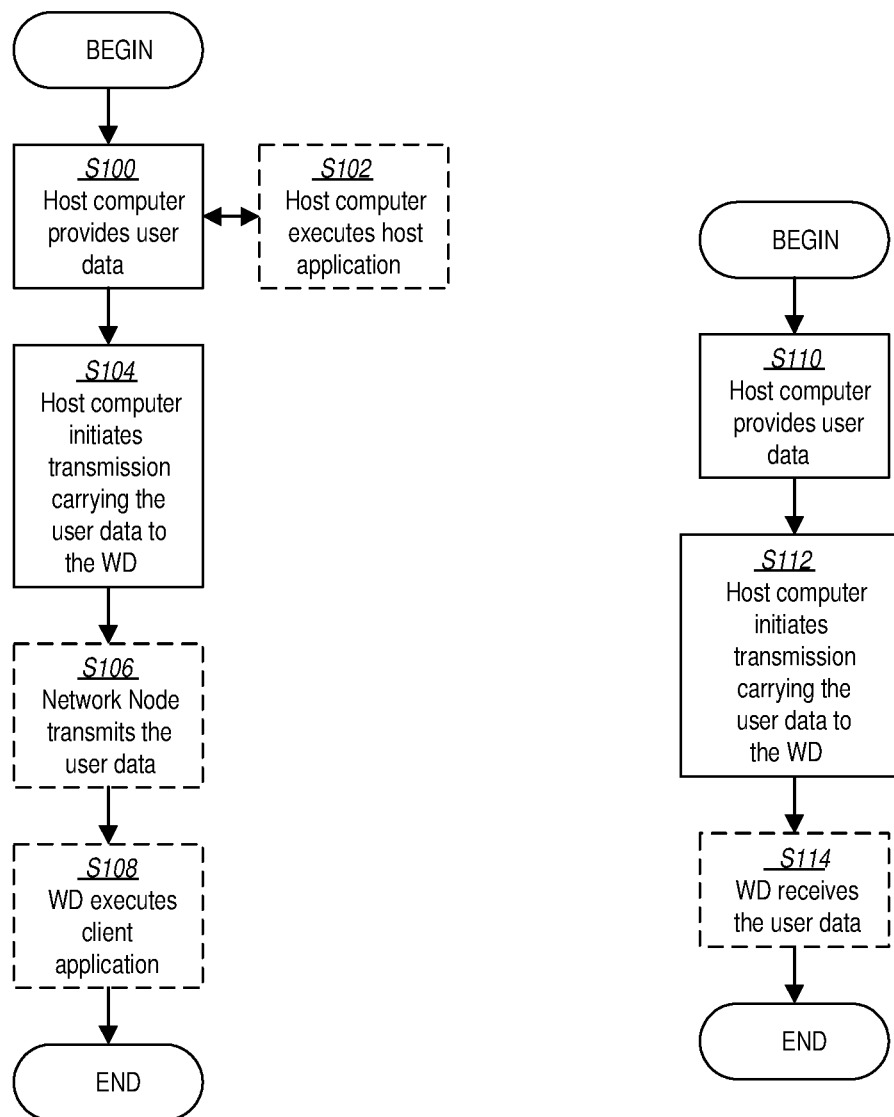
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
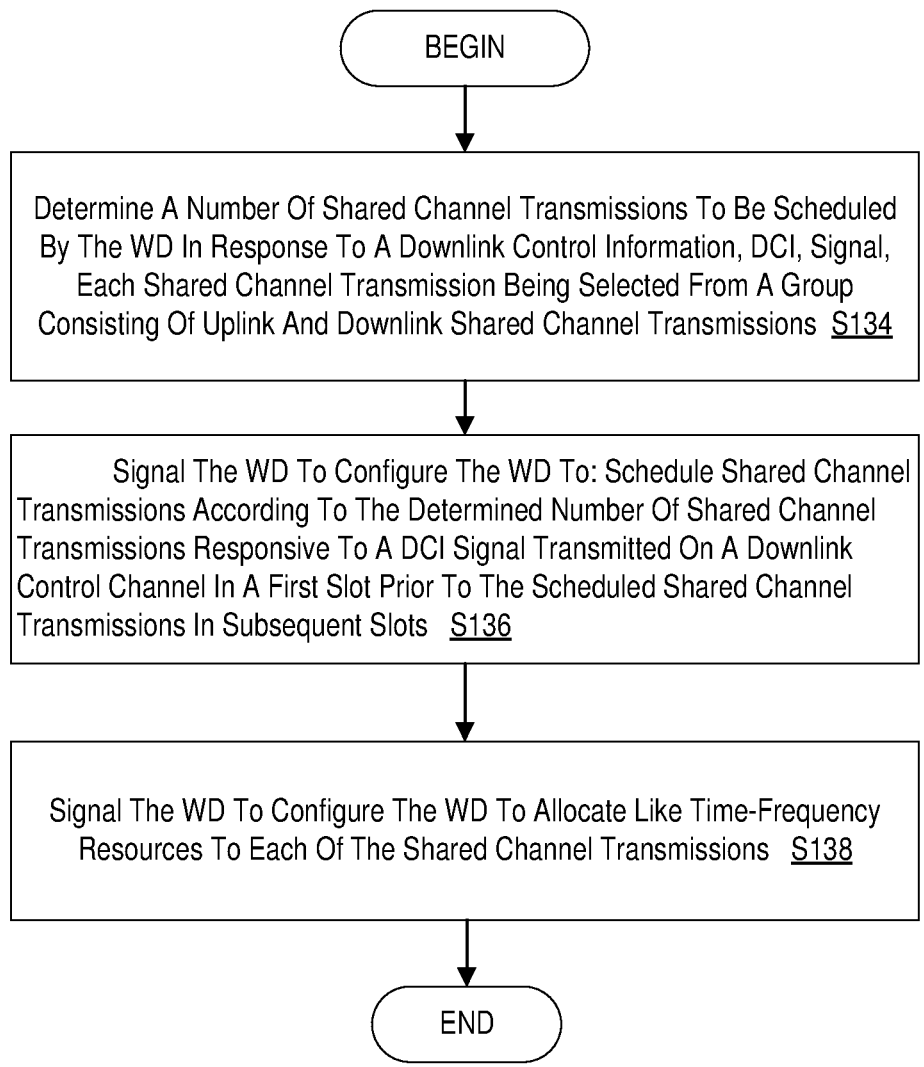
FIG. 9 is a flowchart of an exemplary process in a network node for enhanced single DCI, multi slot scheduling according to some embodiments of the present disclosure.

FIG. 9 is a flowchart of an exemplary process in a network node 16 for enhanced single DCI multi slot scheduling in accordance with the principles of the present disclosure. One or more blocks described herein may be performed by one or more elements of network node 16 such as by one or more of processing circuitry 68 (including the shared channel configuration unit 32 and the network node resource allocator 78), processor 70, radio interface 62 and/or communication interface 60. Network node 16 such as via processing circuitry 68 and/or processor 70 and/or radio interface 62 and/or communication interface 60 is configured to implement a method including determining a pattern of shared channel transmissions to be scheduled by the WD in response to a downlink control information, DCI, where each shared channel transmission is selected from a group consisting of uplink and downlink shared channel transmissions (Block S134). The method includes signaling to the WD to configure the WD to schedule shared channel transmissions according to the determined pattern of shared channel transmissions responsive to a DCI transmitted on a downlink control channel in a first slot prior to the scheduled shared channel transmissions in subsequent slots (Block S136). The method further includes configuring the WD, by the signaling, to allocate like time-frequency resources to each of the shared channel transmissions (Block S138).

Figure 10:
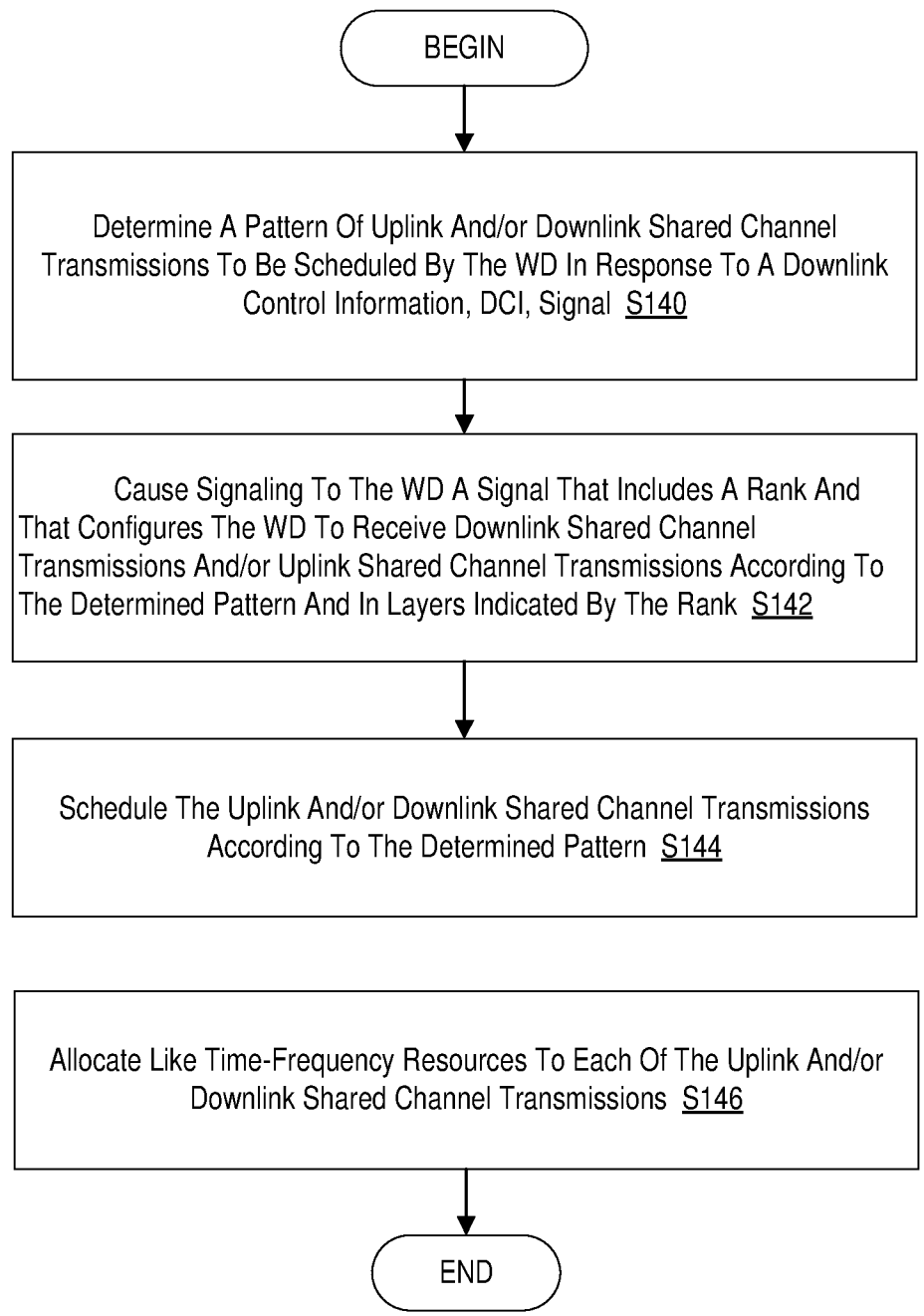
FIG. 10 is a flowchart of an alternative exemplary process in a network node for enhanced DCI, multi slot scheduling according to some embodiments of the present disclosure.

FIG. 10 is a flowchart of an alternative exemplary process in a network node 16 for enhanced single DCI multi slot scheduling in accordance with the principles of the present disclosure. The process includes determining, via processing circuitry 68, a pattern of uplink and/or downlink shared channel transmissions to be scheduled by the WD in response to a downlink control information, DCI, signal (Block S140). The process also includes causing, via the processing circuitry 68, signaling to the WD a signal that includes a rank and that configures the WD to receive downlink shared channel transmissions and/or uplink shared channel transmissions according to the determined pattern and in layers indicated by the rank (Block S142). The process further includes scheduling, via the processing circuitry 68, the uplink and/or downlink shared channel transmissions according to the determined pattern (Block S144). The process includes allocating, via the processing circuitry 68, like time-frequency resources to each of the uplink and/or downlink shared channel transmissions (Block S146).

Figure 11:
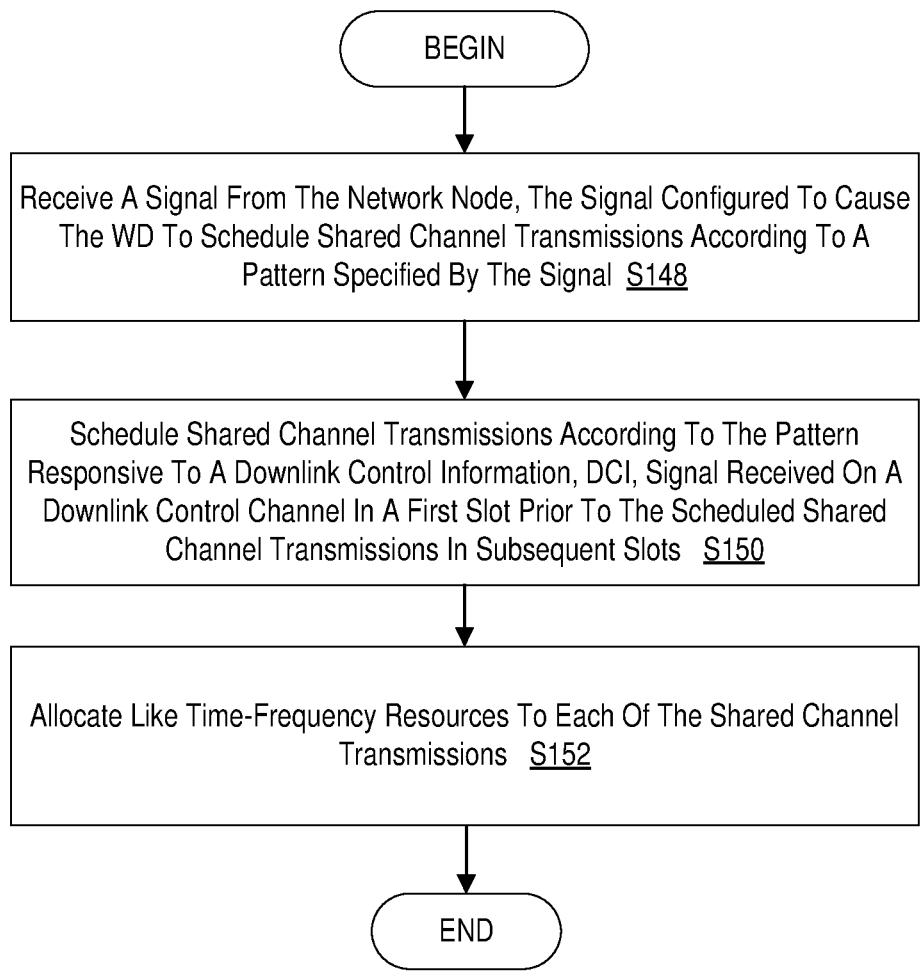
FIG. 11 is a flowchart of an exemplary process in a wireless device for enhanced single DCI, multi slot scheduling according to some embodiments of the present disclosure.

FIG. 11 is a flowchart of an exemplary process performed in a wireless device 22 for enhanced single DCI multi slot scheduling in accordance with the principles of the present disclosure. One or more Blocks described herein may be performed by one or more elements of wireless device 22 such as by one or more of processing circuitry 84 (including the shared channel scheduling unit 34 and the WD resource allocator unit 96), processor 86, radio interface 82 and/or communication interface 60. The wireless device 22 such as via processing circuitry 84 and/or processor 86 and/or radio interface 82 is configured to receive a signal from the network node, the signal configured to cause the WD 22 to schedule shared channel transmissions according to a pattern specified by the signal (Block S140). The WD 22 is further configured to schedule shared channel transmissions according to the pattern responsive to a downlink control information, DCI, received on a downlink control channel in a first slot prior to the scheduled shared channel transmissions in subsequent slots (Block S142). The WD 22 is further configured to allocate like time-frequency resources to each of the shared channel transmissions (Block S144).

Figure 12:
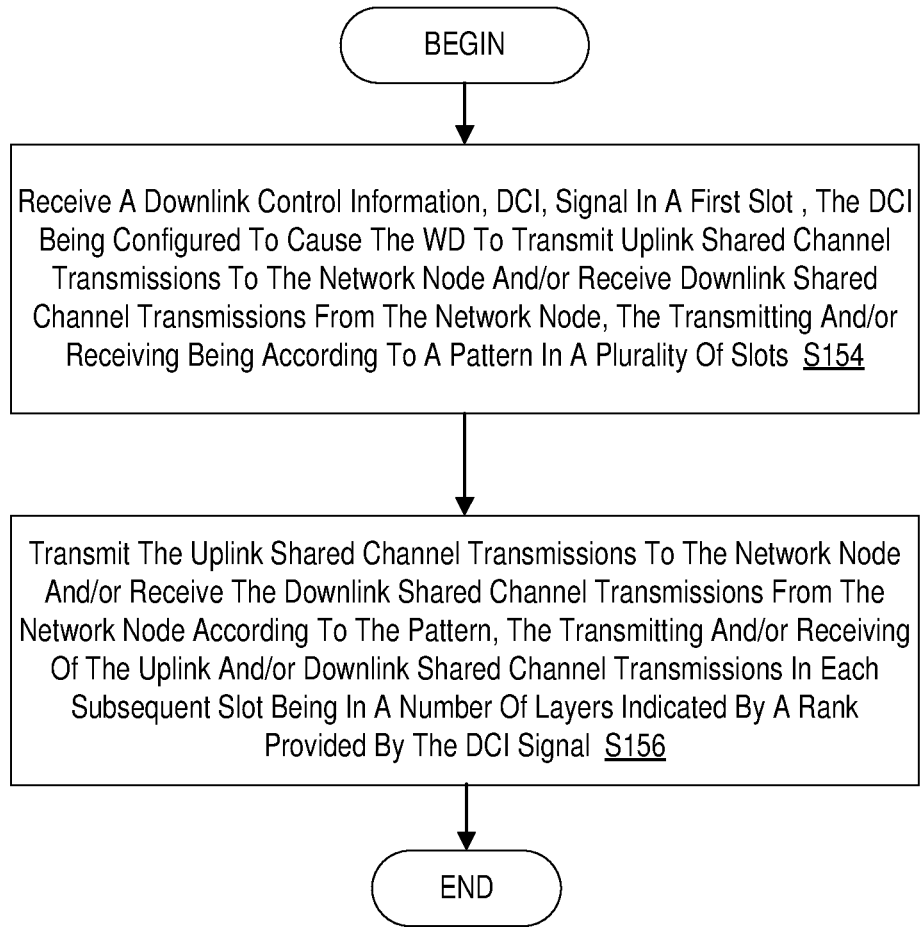
FIG. 12 is a flowchart of an exemplary process in a wireless device for enhanced single DCI, multi slot scheduling according to some embodiments of the present disclosure.

FIG. 12 is a flowchart of an exemplary process performed in a wireless device 22 for enhanced single DCI multi slot scheduling in accordance with the principles of the present disclosure. The process includes receiving, via the radio interface 82, a downlink control information, DCI, signal in a first slot, the DCI being configured to cause the WD to transmit uplink shared channel transmissions to the network node and/or receive downlink shared channel transmissions from the network node, the transmitting and/or receiving being according to a pattern in a plurality of slots (Block S154). The process also includes transmitting, via the radio interface 82, the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal (Block S156).

Having described the general process flow of arrangements of the disclosure and having provided examples of hardware and software arrangements for implementing the processes and functions of the disclosure, the sections below provide details and examples of arrangements for enhanced single DCI multi slot scheduling.

General Framework:

A multi-slot scheduling arrangement is adopted where the network schedules the WD 22 using a single DCI for multiple slots, for example via the network node resource allocator 78. Each scheduled slot may have the same time and frequency domain resource assignment, i.e., like time-frequency resources, for PUSCH and PDSCH, whereby the network node 16 does not need to send multiple individual assignments. Most of the information in the DCI formats may remain the same for all the slots, e.g., modulation and coding scheme (MCS), number of layers, antenna ports, carrier indication, etc. What may vary between the slots is the HARQ process ID of the associated TB, the PUCCH resource, and details related to the HARQ codebook.

The network node 16 can configure the WD 22, for example via signaling by the radio interface 62, to expect multiple slot scheduling using RRC signaling, MAC CE signaling or DCI signaling. Furthermore, the network node 16 can define whether the slots should be assigned consecutively or with some pre-configured static or dynamic gap between the slots. Thus, the network node 16, for example via the shared channel configuration unit 32, can specify a pattern of the shared channel transmissions to be received and/or transmitted by the WD 22.

Additionally, the WD 22 can be configured to expect multi-layer reception and/or transmission. Moreover, the WD 22 can be configured so that each slot (or a subset of the slot aggregate) is associated with a different TB.

As mentioned above, the WD 22 can be configured, for example, via the radio interface 62, with RRC signaling to expect multi-slot scheduling, i.e., that the following DCIs should be interpreted as multi-slot scheduling commands according to the configured aggregationFactorDL/UL and aggregation gap parameters. The RRC signaling may indicate the number of time instances that the multi-slot mode is valid, for example, as determined by the shared channel configuration unit 32. This can be expressed in terms of slots, PDCCH reception instances, connected mode discontinuous reception (CDRX) ON-durations, synchronization signal (SS) instances, symbols, etc.

In some embodiments, it may be more effective to invoke faster MAC CE or DCI signaling instead of, or in addition to, RRC signaling. For example, RRC signaling can configure the WD 22 to expect a multi-slot command with some properties, such as a number of slots and possible gaps between them, if the same or different TBs are to be assigned, etc. A DCI bit or bit field in scheduling DCI formats may be employed to indicate whether the current DCI is a multi-slot or single-slot scheduling DCI. In an alternative embodiment, MAC CE signaling may be used to switch the WD 22 between single-slot or multi-slot modes according to a previous configuration via RRC signaling, or the MAC CE command itself may provide the multi-slot mode parameters. Alternatively, the multi-slot mode may be valid until further notice via another RRC command. The multi-slot mode may be valid for any DCI or limited to some DCIs, e.g., limited to certain RNTI-values associated with the DCI, certain search spaces and/or a certain CORESET.

Therefore, in some embodiments, a pattern of UL and DL slots may be determined by the shared channel configuration unit 32 of the network node 16. The time-frequency resources for this pattern can be determined by the network node resource allocator 78. The pattern and resource allocation may be signaled to the WD 22 via RRC signaling, MAC CE signaling or DCI signaling. The shared channel scheduling unit 34 and the WD resource allocator unit 96 of the WD 22 may schedule the pattern of UL and DL transmissions and resource allocation for the wireless device 22 according to the pattern and allocation specified and signaled by the network node 16.

Figure 13:
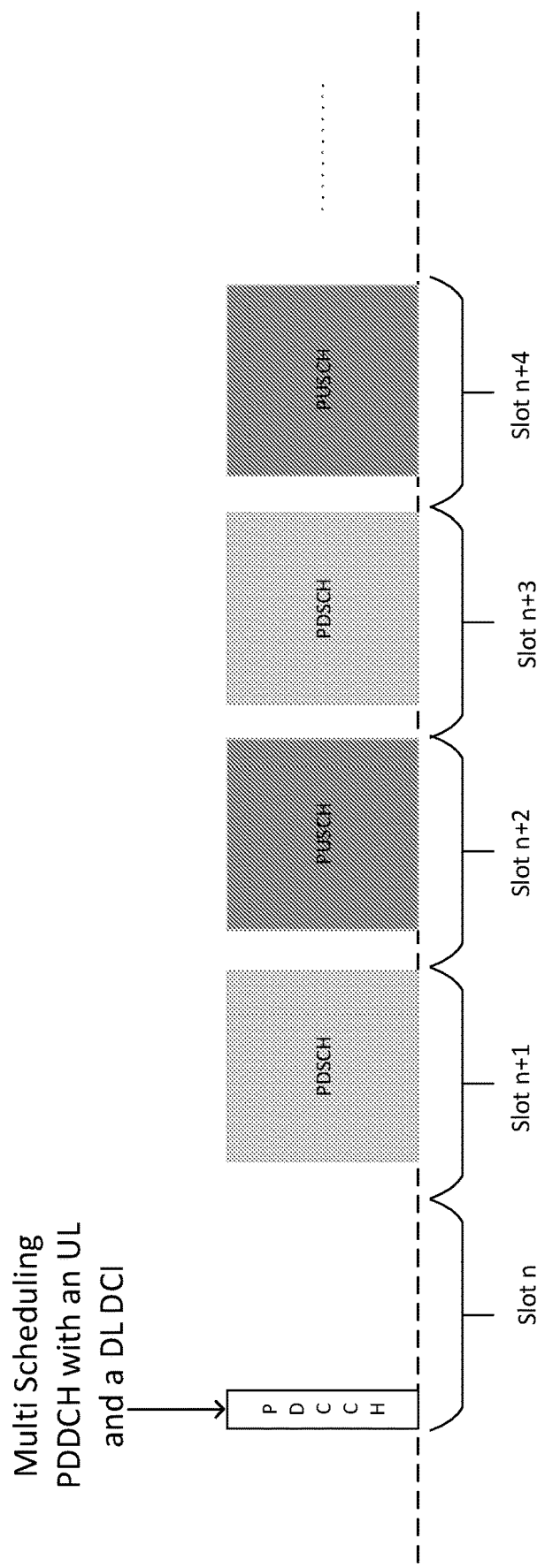
FIG. 13 is a pattern of multi scheduling of PDSCH and PUSCH transmissions in alternating slots according to some embodiments of the present disclosure.

FIG. 13 illustrates an example of a multi-slot scheduling arrangement described above. In the example, k0=1 is used.

Note that the k0 only applies to the first scheduled PDSCH; the subsequent PDSCH gaps are controlled by aggregation gap parameters, such as an indication of an aggregation gap pattern. This figure shows a DL-UL-DL-UL example. Other DL/UL patterns are possible, such as DL-DL-UL-DL-DL-UL, for example. The pattern can be specified in the same ways as the other multi-slot scheduling parameters.

One approach that is less complex to implement than known solutions is to define the aggregation gap pattern by defining parameters such as aggregationOffsetDL and aggregationFactorUL. These two parameters can also be defined in different ways. For example, the aggregationOffsetDL parameter could store either a count of DL slots only, or alternatively a count of DL and UL slots. In the former case, the WD 22 could be configured with a DL/UL pattern since the WD 22 needs to know which slots are UL. This could be omitted when aggregationOffsetDL is used to count both DL and UL. The parameter, aggregationFactorDL, can be used to either count actually aggregated slots or the number of slots starting from first_slot until first_slot+aggregationFactorDL−1. The slot aggregation may be upper-limited to this set of slots. For other criteria such as UL slots, a parameter such as aggregationOffsetDL>1, could lead to exclusion of certain slots. The same principles can be applied to the UL parameters, aggregationOffsetDL and aggregationFactorUL.

What has been described above and the rest of this description about time units counted in slots, can as a generalization be counted in terms of symbols, or blocks of certain numbers of symbols. This can be useful for multi-half-slot scheduling.

Multi-Slot Scheduling DCI Design:

As described above, a single DCI may be used to schedule the WD 22, via the shared channel scheduling unit 34, for multiple slots or symbols with a specific pattern. There are a number of reserved bits in the current DCIs which can be used for this purpose. Below are listed some examples. In some embodiments, the current DCI sizes could remain the same.

DCI Formats 0-0/0-1:

These DCI formats are used for PUSCH scheduling. As mentioned above, all of the slots may follow the same resource assignment, and thus the current bit fields may remain the same for all the slots. In addition, if configured by RRC signaling, a DCI bit or bit field could be used to indicate a single or multiple slot scheduling DCI.

Nevertheless, in order to make the procedure more dynamic, additional information can also be included in the DCI. For example, a bit field indicating the number of slots which are scheduled, or a bit field indicating if the same or different TBs are scheduled, may be employed. Furthermore, a bit field can indicate the gap pattern between the slots. To do so, either some reserved bits or an indication to the invalid row indices in the current standard can be used.

DCI Formats 1-0/1-1:

These DCI formats are used for PDSCH scheduling. The same approaches as above can be applied here as well. Thus, one or more of the reserved bits can be used for indicating multi-slot DL scheduling, and if there is space, additional information can also be included to allow a more dynamic multi-slot scheduling procedure. Additional aspects to be considered here are related to HARQ operation and feedback and the PUCCH resources. In one approach, the following may be provided:

a single K1 value (indicating the slot for the HARQ feedback);
a single PUCCH resource indicator (the PUCCH resource to be used for HARQ feedback in the indicated slot);
a single Counter and/or Total Downlink Assignment Index (DAI) (counting the number of DL assignments up to a present value);
a single New Data Indicator (NDI) (indicating that a HARQ process contains a new TB or a re-transmission of a previously transmitted TB); and
a single HARQ process ID.

In another approach, for at least one of the above parameters, at least one additional value is provided for a second slot. In case not all of the above parameters are provided for each slot of the slot aggregate, rules are needed to determine the missing parameters.

Multi-Layer Transmission:

The DCI format used for scheduling may be such that multi-layer scheduling is possible, i.e., 0-1 or 1-1. The layer structure (rank, precoding, etc.) indicated in the DCI may apply to all slots in the multi-slot scheduling set.

One or Multiple TBs:

The WD 22 can be configured (via RRC signaling, MAC signaling, or dynamically indicated in the DCI, or via a combined signaling scheme of previous protocols) to receive or transmit a single TB across all slots of the multi-slot scheduling. Alternatively, one TB may be associated with each slot of the slot aggregate. In some embodiments, sub-sets of slots may be associated with the same TB, e.g., in a slot aggregate of four slots where two sub-sets with two slots each are formed and each sub-set is associated with a TB.

UL and DL Scheduling Format from Single DCI:

In one embodiment, where multi-slot scheduling is performed, for example, via the shared channel configuration unit 32 and shared channel scheduling unit 34, including both DL and UL slots, the number of DCI bits can be reduced by letting all or a part of the UL format (e.g., MCS, number of layers, transmission mode) be determined by a mapping of the DL format as given by the DL DCI. Alternatively, the DCI could specify the UL format, and let the DL format be determined by a mapping. The mapping itself can be configured by RRC signaling.

Additional Aspects

As discussed above, single DCI multi-slot scheduling for either the DL or the UL can be implemented. However, in one embodiment, the network node 16 can send, for example via the radio interface 62, both UL and DL DCIs at the same time, scheduling multiple slots for the UL and the DL. These slots can be scheduled, for example via the processing circuitry 68, to be alternating, or multiple UL after multiple DL or vice versa, or even in the same slot, if the slot format indicator allows that.

In another embodiment, the network node 16 can, for example, by signaling from the radio interface 62, configure the WD 22 such that if the WD 22 receives a multiple slot scheduling DCI in one slot, the WD 22 should not expect another PDCCH until the end of PUSCH/PDSCH and related HARQ procedure. In this way, the WD 22 can choose to micro sleep at times it does not expect a PDSCH reception. In a related embodiment, the WD 22 may be configured not to expect another PDCCH until a next CDRX ON-duration.

The network node 16 may, for example, via the shared channel configuration unit 32, select the multi-slot scheduling mode when the DL buffer for the WD 22 has more data than is possible to deliver during a single slot, and when the channel conditions are changing slowly enough so that link adaptation is valid over the multiple-slot time interval. The multi-slot mode, extending the transmission in time, may be preferable for the network node 16, and for WDs 22, e.g., when the total carrier bandwidth is wider than the bandwidth supported by individual WDs 22. Multiple WDs 22 can then be scheduled simultaneously, using adjacent frequency regions in the carrier in a more static, predictable manner.

In one embodiment, the multi-slot scheduling mode can be used for reserving resources for a WD 22, making certain time-frequency resources consistently available during a certain time interval. The WD 22 may then operate in a power-efficient receive mode for PDSCH reception, configuring, for example, via the processing circuitry 84, a suitable bandwidth, micro-sleep pattern, etc.

According to one aspect, a wireless device, WD 22, configured to communicate with a network node, includes a radio interface 82 configured to receive a downlink control information, DCI, signal in a first slot, the DCI being configured to cause the WD 22 to transmit uplink shared channel transmissions to the network node and/or receive downlink shared channel transmissions from the network node, the transmitting and/or receiving being according to a pattern in a plurality of slots. The radio interface 82 is further configured to transmit the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal.

According to this aspect, in some embodiments, the transmitting or receiving uses different transport blocks, TBs, in each of at least two slots. In some embodiments, different TBs have different hybrid automatic repeat request, HARQ, identifications, and/or different payload content. In some embodiments, the DCI is configured to cause the WD 22 to transmit and receive according to the pattern without increasing a size of the DCI. In some embodiments, the pattern is indicated by a control signal from the network node to the WD 22, the control signal being the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, processing circuitry in communication with the transceiver is configured to allocate a first set of like time-frequency resources to each of the uplink shared channel transmissions and allocate a second set of like time-frequency resources to each of the downlink shared channel transmissions. In some embodiments, the DCI signal indicates whether a Hybrid Automatic Repeat Request, HARQ, process is to contain a different transport block, TB, than a previously transmitted TB.

According to another aspect, a method in a wireless device, WD 22, configured to communicate with a network node, is provided. The method includes receiving, via the radio interface 82, a downlink control information, DCI, signal in a first slot, the DCI being configured to cause the WD 22 to transmit uplink shared channel transmissions to the network node and/or receive downlink shared channel transmissions from the network node, the transmitting and/or receiving being according to a pattern in a plurality of slots. The method further includes transmitting, via the radio interface 82, the uplink shared channel transmissions to the network node and/or receive the downlink shared channel transmissions from the network node according to the pattern, the transmitting and/or receiving of the uplink and/or downlink shared channel transmissions in each slot being in a number of layers indicated by a rank provided by the DCI signal.

According to this aspect, in some embodiments, the transmitting or receiving uses different transport blocks, TBs, in each of at least two slots. In some embodiments, the different TBs have different hybrid automatic repeat request, HARQ, identifications, and/or different payload content. In some embodiments, the DCI is configured to cause the WD 22 to transmit and receive according to the pattern without increasing a size of the DCI. In some embodiments, the pattern is indicated by a control signal from the network node to the WD 22, the control signal being the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the method further includes allocating, via the processing circuitry 84, a first set of like time-frequency resources to each of the uplink shared channel transmissions and allocate a second set of like time-frequency resources to each of the downlink shared channel transmissions. In some embodiments, the DCI signal indicates whether a Hybrid Automatic Repeat Request, HARQ, process is to contain a different transport block, TB, than a previously transmitted TB.

According to yet another aspect, a network node 16 configured to communicate with a wireless device, WD 22 includes processing circuitry 68 configured to determine a pattern of uplink and/or downlink shared channel transmissions to be scheduled by the WD 22 in response to a downlink control information, DCI, signal. The processing circuitry 68 is further configured to cause signaling to the WD 22 a signal that includes a rank and that configures the WD 22 to receive downlink shared channel transmissions and/or uplink shared channel transmissions according to the determined pattern and in layers indicated by the rank. The processing circuitry 68 is further configured to schedule the uplink and/or downlink shared channel transmissions according to the determined pattern, and allocate like time-frequency resources to each of the uplink and/or downlink shared channel transmissions.

According to this aspect, in some embodiments, the DCI is configured to cause the WD 22 to transmit and receive according to the pattern without increasing a size of the DCI. In some embodiments, the processing circuitry 68 is further configured to cause signaling of an indication of the pattern to the WD 22 by one of the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the DCI signal indicates whether a Hybrid Automatic Repeat Request, HARQ, process is to contain a different transport block, TB, than a previously transmitted TB.

According to another aspect, a method in a network node 16 configured to communicate with a wireless device, WD, 22 includes determining, via the processing circuitry 68, a pattern of uplink and/or downlink shared channel transmissions to be scheduled by the WD 22 in response to a downlink control information, DCI, signal. The method also includes signaling to the WD 22 a signal that includes a rank and that configures the WD to receive downlink shared channel transmissions and/or uplink shared channel transmissions according to the determined pattern and in layers indicated by the rank. The method also includes scheduling, via the processing circuitry 68, the uplink and/or downlink shared channel transmissions according to the determined pattern, and allocating, via the processing circuitry 68, like time-frequency resources to each of the uplink and/or downlink shared channel transmissions.

According to this aspect, in some embodiments, the DCI is configured to cause the WD 22 to transmit and receive according to the pattern without increasing a size of the DCI. In some embodiments, the method includes causing, via the processing circuitry 68, signaling of an indication of the pattern to the WD 22 by one of the DCI signal, a radio resource control, RRC, signal or a medium access, MAC, control element, CE, signal. In some embodiments, the pattern is an alternating pattern of uplink shared channel transmissions and downlink shared channel receptions. In some embodiments, the pattern includes a first block of successive downlink shared channel reception followed by a second block of successive uplink shared channel transmissions. In some embodiments, the pattern includes gaps between successive uplink shared channel transmissions and/or downlink shared channel receptions. In some embodiments, the DCI signal indicates whether a Hybrid Automatic Repeat Request, HARQ, process is to contain a different transport block, TB, than a previously transmitted TB.

According to yet another aspect, a method implemented in a network node 16 includes determining a pattern of shared channel transmissions to be scheduled by the WD 22 in response to a downlink control information, DCI signal. Each shared channel transmission is selected from a group consisting of uplink and downlink shared channel transmissions, each of the shared channel transmissions to be allocated like time-frequency resources. The method includes signaling the WD 22 to configure the WD 22 to schedule shared channel transmissions according to the determined pattern of shared channel transmissions responsive to a DCI signal transmitted on a downlink control channel in a first slot prior to the scheduled shared channel transmissions in subsequent slots. The signaling also configures the WD 22 to allocate like time-frequency resources to each of the shared channel transmissions.

According to this aspect, in some embodiments, the configuration signaling further configures the WD 22 to receive successive downlink shared channel transmissions and transmit successive uplink shared channel transmissions in alternate slots. In some embodiments, the configuration signaling further configures the WD 22 to receive a first block of successive downlink shared channel transmissions followed by transmitting a block of successive uplink shared transmissions. In some embodiments, the configuration signaling further configures the WD 22 to schedule gaps between successive shared channel transmissions. In some embodiments, the configuration signaling includes a parameter defining a pattern of shared channel transmissions to be scheduled by the WD 22. In some embodiments, the scheduling is in units of one of slots and symbols. In some embodiments, the DCI signal has a bit which instructs the WD 22 to perform one of scheduling multiple shared channel transmissions before a next DCI signal and scheduling only a single shared channel transmission before a next DCI signal. In some embodiments, the configuration signaling is via one of radio resource control, RRC, signaling, medium access, MAC, control element, CE, signaling and DCI signaling. In some embodiments, the configuration signaling indicates whether a Hybrid Automatic Repeat Request, HARQ, process contains a new transport block, TB. In some embodiments, a DCI is of a format selected from the group consisting of formats 1-0, 1-1, 0-0 and 0-1.

According to another aspect, a method implemented in a WD 22 is provided. The method includes receiving a signal from the network node 16, the signal configured to cause the WD 22 to schedule shared channel transmissions according to a pattern specified by the signal. The method also includes scheduling shared channel transmissions according to the pattern responsive to a downlink control information, DCI, signal received on a downlink control channel in a first slot prior to the scheduled shared channel transmissions in subsequent slots. The method further includes allocating like time-frequency resources to each of the shared channel transmissions.

According to this aspect, in some embodiments, responsive to the specified pattern, the WD 22 receives successive downlink shared channel transmissions and transmits successive uplink shared channel transmissions in alternate slots. In some embodiments, responsive to the specified pattern, the WD 22 receives a first block of successive downlink shared channel transmissions followed by transmitting a block of successive uplink shared transmissions. In some embodiments, responsive to the specified pattern, the WD 22 schedules gaps between successive shared channel transmissions. In some embodiments, the scheduling is in units of one of slots and symbols. In some embodiments, responsive to the DCI signal, the WD 22 performs one of scheduling multiple shared channel transmissions before a next DCI signal and scheduling only a single shared channel transmission before a next DCI signal. In some embodiments, the received signal is one of a radio resource control, RRC, signal, a medium access, MAC, control element, CE, signal and a DCI.

Some further embodiments may include:

Embodiment A1. A network node configured to communicate with a wireless device (WD), the network node configured to, and/or comprising a radio interface and/or comprising processing circuitry configured to:
   determine a pattern of shared channel transmissions to be scheduled by the WD in response to a downlink control information, DCI, signal, each shared channel transmission being selected from a group consisting of uplink and downlink shared channel transmissions; and
   signal the WD to configure the WD to:
   schedule shared channel transmissions according to the determined pattern of shared channel transmissions responsive to a DCI signal transmitted on a downlink control channel in a first slot prior to the scheduled shared channel transmissions in subsequent slots; and
   allocate like time-frequency resources to each of the shared channel transmissions.

Embodiment A2. The network node of Embodiment A1, wherein the configuration signaling further configures the WD to receive successive downlink shared channel transmissions and transmit successive uplink shared channel transmissions in alternate slots.

Embodiment A3. The network node of Embodiment A1, wherein the configuration signaling further configures the WD to receive a first block of successive downlink shared channel transmissions followed by transmitting a block of successive uplink shared transmissions.

Embodiment A4. The network node of any of Embodiments A1-A3, wherein the configuration signaling further configures the WD to schedule gaps between successive shared channel transmissions.

Embodiment A5. The network node of any of Embodiments A1-A5, wherein the configuration signaling includes a parameter defining a pattern of shared channel transmissions to be scheduled by the WD.

Embodiment A6. The network node of any of Embodiments A1-A5, wherein the scheduling is in units of one of slots and symbols.

Embodiment A7. The network node of any of Embodiments A1-A6, wherein the DCI signal has a bit which instructs the WD to perform one of scheduling multiple shared channel transmissions before a next DCI signal and scheduling only a single shared channel transmission before a next DCI signal.

Embodiment A8. The network node of any of Embodiments A1-A7, wherein the configuration signaling is via one of radio resource control, RRC, signaling, medium access, MAC, control element, CE, signaling and DCI signaling.

Embodiment A9. The network node of any of Embodiments A1-A8, wherein the configuration signaling indicates whether a Hybrid Automatic Repeat Request, HARQ, process contains a new transport block, TB.

Embodiment A10. The network node of any of Embodiments A1-A8, wherein a DCI signal is of a format selected from the group consisting of formats 1-0, 1-1, 0-0 and 0-1.

Embodiment B1. A method implemented in a network node, the method comprising:
  determining a pattern of shared channel transmissions to be scheduled by the WD in response to a downlink control information, DCI, signal, each shared channel transmission being selected from a group consisting of uplink and downlink shared channel transmissions; and
  signaling the WD to configure the WD to:
  schedule shared channel transmissions according to the determined pattern of shared channel transmissions responsive to a DCI signal transmitted on a downlink control channel in a first slot prior to the scheduled shared channel transmissions in subsequent slots; and
  allocate like time-frequency resources to each of the shared channel transmissions.

Embodiment B2. The method of Embodiment B1, wherein the configuration signaling further configures the WD to receive successive downlink shared channel transmissions and transmit successive uplink shared channel transmissions in alternate slots.

Embodiment B3. The method of Embodiment B1, wherein the configuration signaling further configures the WD to receive a first block of successive downlink shared channel transmissions followed by transmitting a block of successive uplink shared transmissions.

Embodiment B4. The method of any of Embodiments B1-B3, wherein the configuration signaling further configures the WD to schedule gaps between successive shared channel transmissions.

Embodiment B5. The method of any of Embodiments B1-B5, wherein the configuration signaling includes a parameter defining a pattern of shared channel transmissions to be scheduled by the WD.

Embodiment B6. The method of any of Embodiments B1-B5, wherein the scheduling is in units of one of slots and symbols.

Embodiment B7. The method of any of Embodiments B1-B6, wherein the DCI signal has a bit which instructs the WD to perform one of scheduling multiple shared channel transmissions before a next DCI signal and scheduling only a single shared channel transmission before a next DCI signal.

Embodiment B8. The method of any of Embodiments B1-B7, wherein the configuration signaling is via one of radio resource control, RRC, signaling, medium access, MAC, control element, CE, signaling and DCI signaling.

Embodiment B9. The method of any of Embodiments B1-B8, wherein the configuration signaling indicates whether a Hybrid Automatic Repeat Request, HARQ, process contains a new transport block, TB.

Embodiment B10. The method of any of Embodiments B1-B9, wherein a DCI signal is of a format selected from the group consisting of formats 1-0, 1-1, 0-0 and 0-1.

Embodiment C1. A wireless device (WD) configured to communicate with a network node, the WD configured to, and/or comprising a radio interface and/or processing circuitry configured to:
  receive a signal from the network node, the signal configured to cause the WD to schedule shared channel transmissions according to a pattern specified by the signal;
  schedule shared channel transmissions according to the pattern responsive to a downlink control information, DCI, signal received on a downlink control channel in a first slot prior to the scheduled shared channel transmissions in subsequent slots; and
  allocate like time-frequency resources to each of the shared channel transmissions.

Embodiment C2. The WD of Embodiment C1, wherein, responsive to the specified pattern, the WD receives successive downlink shared channel transmissions and transmits successive uplink shared channel transmissions in alternate slots.

Embodiment C3. The WD of Embodiment C1, wherein, responsive to the specified pattern, the WD receives a first block of successive downlink shared channel transmissions followed by transmitting a block of successive uplink shared transmissions.

Embodiment C4. The WD of any of Embodiments C1-C3, wherein, responsive to the specified pattern, the WD schedules gaps between successive shared channel transmissions.

Embodiment C5. The WD of any of Embodiments C1-C4, wherein the scheduling is in units of one of slots and symbols.

Embodiment C6. The WD of any of Embodiments C1-C5, wherein, responsive to the DCI signal, the WD performs one of scheduling multiple shared channel transmissions before a next DCI signal and scheduling only a single shared channel transmission before a next DCI signal.

Embodiment C7. The WD of any of Embodiments C1-C6, wherein the received signal is one of a radio resource control, RRC, signal, a medium access, MAC, control element, CE, signal and a DCI signal.

Embodiment D1. A method implemented in a wireless device (WD), the method comprising:
  receiving a signal from the network node, the signal configured to cause the WD to schedule shared channel transmissions according to a pattern specified by the signal;
  scheduling shared channel transmissions according to the pattern responsive to a downlink control information, DCI, signal received on a downlink control channel in a first slot prior to the scheduled shared channel transmissions in subsequent slots; and
  allocating like time-frequency resources to each of the shared channel transmissions.

Embodiment D2. The method of Embodiment D1, wherein, responsive to the specified pattern, the WD receives successive downlink shared channel transmissions and transmits successive uplink shared channel transmissions in alternate slots.

Embodiment D3. The method of Embodiment D1, wherein, responsive to the specified pattern, the WD receives a first block of successive downlink shared channel transmissions followed by transmitting a block of successive uplink shared transmissions.

Embodiment D4. The method of any of Embodiments D1-D3, wherein, responsive to the specified pattern, the WD schedules gaps between successive shared channel transmissions.

Embodiment D5. The method of any of Embodiments D1-D4, wherein the scheduling is in units of one of slots and symbols.

Embodiment D6. The method of any of Embodiments D1-D5, wherein, responsive to the DCI signal, the WD performs one of scheduling multiple shared channel transmissions before a next DCI signal and scheduling only a single shared channel transmission before a next DCI signal.

Embodiment D7. The method of any of Embodiments D1-D6, wherein the received signal is one of a radio resource control, RRC, signal, a medium access, MAC, control element, CE, signal and a DCI signal.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| 5G | 5th Generation |
| BB | Baseband |
| BW | Bandwidth |
| C-DRX/CDRX | Connected mode DRX (i.e. DRX in RRC_CONNECTED state) |
| CRC | Cyclic Redundancy Check |
| DCI | Downlink Control Information |
| DL | Downlink |
| DRX | Discontinuous Reception |
| gNB | A radio base station in 5G/NR. |
| GTS | Go to sleep |
| HARQ | Hybrid Automatic Repeat Request |
| IoT | Internet of Things |
| LO | Local Oscillator |
| LTE | Long Term Evolution |
| MAC | Medium Access Control |
| MCS | Modulation and Coding Scheme |
| mMTC | massive MTC (referring to scenarios with ubiquitously deployed MTC devices) |
| ms | millisecond |
| MTC | Machine Type Communication |
| NB | Narrowband |
| NB-IoT | Narrowband Internet of Things |
| NR | New Radio |
| NW | Network |
| PDCCH | Physical Downlink Control Channel |
| PDSCH | Physical Downlink Shared Channel |
| RF | Radio Frequency |
| RNTI | Radio Network Temporary Identifier |
| RRC | Radio Resource Control |
| RX | Receiver/Reception |
| SSB | Synchronization Signal Block |
| T/F | Time/Frequency |
| TX | Transmitter/Transmission |
| UE | User Equipment |
| UL | Uplink |
| WU | Wake-up |
| WUG | Wake-up Group |
| WUR | Wake-up Radio/Wake-up Receiver |
| WUS | Wake-up Signal/Wake-up Signaling |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising a radio interface configured to:
receive a downlink control information, DCI, signal in a first slot, the DCI being configured to cause the WD to at least one of transmit uplink shared channel transmissions to the network node and receive downlink shared channel transmissions from the network node, the at least one of the transmitting and receiving being according to a pattern of a plurality of slots, the pattern comprising:
at least one of a pattern of uplink shared channel slots and downlink shared channel slots; and
gaps between successive at least ones of uplink shared channel transmissions and downlink shared channel receptions; and
at least one of transmit the uplink shared channel transmissions to the network node and receive the downlink shared channel transmissions from the network node according to the pattern, the at least one of the transmitting and receiving of at least one of the uplink and downlink shared channel transmissions in each slot being in a number of layers indicated by a rank provided by the DCI signal.

2. The WD of claim 1, wherein the at least one of the transmitting and receiving uses different transport blocks, TBs, in each of at least two slots.

3. The WD of claim 2, wherein different TBs have at least one of different hybrid automatic repeat request, HARQ, identifications and different payload content.

4. The WD of claim 1, wherein the DCI is configured to cause the WD to transmit and receive according to the pattern without increasing a size of the DCI.

5. The of claim 1, wherein the pattern is indicated by a control signal from the network node to the WD, the control signal being one of the DCI signal, a radio resource control, RRC, signal and a medium access, MAC, control element, CE, signal.

6. The WD of claim 1, wherein the pattern is an alternating pattern of uplink shared channel transmissions and downlink shared channel receptions.

7. The WD of claim 1, wherein the pattern includes a first block of successive downlink shared channel reception followed by a second block of successive uplink shared channel transmissions.

8. The WD of claim 1, further comprising processing circuitry configured to allocate a first set of like time-frequency resources to each of the uplink shared channel transmissions and allocate a second set of like time-frequency resources to each of the downlink shared channel transmissions.

9. A method in a wireless device, WD, configured to communicate with a network node, the method comprising:
receiving a downlink control information, DCI, signal in a first slot, the DCI being configured to cause the WD to at least one of transmit uplink shared channel transmissions to the network node and receive downlink shared channel transmissions from the network node, the at least one of the transmitting and receiving being according to a pattern of a plurality of slots, the pattern comprising:
at least one of a pattern of uplink shared channel slots and downlink shared channel slots; and
gaps between successive at least ones of uplink shared channel transmissions and downlink shared channel receptions; and
at least one of transmitting the uplink shared channel transmissions to the network node and receiving the downlink shared channel transmissions from the network node according to the pattern, the at least one of the transmitting and receiving of at least one of the uplink and downlink shared channel transmissions in each slot being in a number of layers indicated by a rank provided by the DCI signal.

10. The method of claim 9, wherein the at least one of the transmitting and receiving uses different transport blocks, TBs, in each of at least two slots.

11. The method of claim 10, wherein the different TBs have at least one of different hybrid automatic repeat request, HARQ, identifications and different payload content.

12. The method of claim 9, wherein the DCI is configured to cause the WD to transmit and receive according to the pattern without increasing a size of the DCI.

13. The method of claim 9, wherein the pattern is indicated by a control signal from the network node to the WD, the control signal being one of the DCI signal, a radio resource control, RRC, signal and a medium access, MAC, control element, CE, signal.

14. The method of claim 9, wherein the pattern is an alternating pattern of uplink shared channel transmissions and downlink shared channel receptions.

15. The method of claim 9, wherein the pattern includes a first block of successive downlink shared channel reception followed by a second block of successive uplink shared channel transmissions.

16. The method of claim 9, further comprising allocating a first set of like time-frequency resources to each of the uplink shared channel transmissions and allocate a second set of like time-frequency resources to each of the downlink shared channel transmissions.

17. The method of claim 9, wherein the DCI signal indicates whether a Hybrid Automatic Repeat Request, HARQ, process is to contain a different transport block, TB, than a previously transmitted TB.

18. A method in a network node configured to communicate with a wireless device, WD, the method comprising:
    determining a pattern of at least one of uplink and downlink shared channel transmissions to be scheduled by the WD in response to a downlink control information, DCI, signal of a plurality of slots, the pattern comprising:
        at least one of a pattern of uplink shared channel slots and downlink shared channel slots; and
        gaps between successive at least ones of uplink shared channel transmissions and downlink shared channel receptions;
    signaling to the WD a signal that includes a rank and that configures the WD to at least one of receive downlink shared channel transmissions and uplink shared channel transmissions according to the determined pattern and in layers indicated by the rank;
    scheduling the at least one of the uplink and downlink shared channel transmissions according to the determined pattern; and
    allocating like time-frequency resources to each of the at least one of the uplink and downlink shared channel transmissions.

\* \* \* \* \*